United States Patent Office 3,166,564
Patented Jan. 19, 1965

3,166,564
DITHIAZOLIUM SALTS
William R. Diveley, Newark, Del., assignor to Hercules Powder Company, Wilmington, Del., a corporation of Delaware
No Drawing. Filed Sept. 4, 1962, Ser. No. 221,328
7 Claims. (Cl. 260—306.8)

This invention relates to new compositions of matter having defoliating properties and more particularly to 3,5-bis(substituted amino)-1,2,4-dithiazolium salts and to methods for their production.

In accordance with the present invention it has been found that 3,5-bis(substituted amino)-1,2,4-dithiazolium salts having the general formula

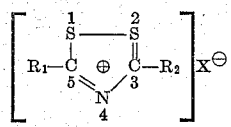

wherein X represents an anion of an acid having an ionization constant of at least $1 \times 10^{-7}$, and $R_1$ and $R_2$ represent substituted secondary amino groups, are novel compounds having defoliating properties and are readily prepared by oxidation of the 1,1,5,5-tetra-substituted dithiobiuret in the presence of the said acid anion.

The acids which form stable salts of this invention are organic or inorganic acids. Suitable acids are those which have an ionization constant of at least $1 \times 10^{-7}$ and preferably at least $1 \times 10^{-6}$ and include HCl, HBr, HF, HI, $H_2SO_4$, HSCN, $H_3PO_4$, $H_2SO_3$, fatty acids, particularly acetic acid, chlorinated fatty acids, particularly mono-, di- and tri-chloracetic acids, oxalic acid, tartaric acid, dinitrophenols, trinitrophenols, particularly picric acid, benzoic acid, toluic acid and naphthoic acid.

The 3,5-bis(substituted amino)-1,2,4-dithiazolium salts when freed of the acid radical have been found to be unstable compounds, while these salts of inorganic acids, carboxylic acids and other strong acids are stable. Thus the compounds of this invention are obtained only by preparation in the presence of an acid anion capable of forming a salt, and the compounds decompose if reacted with a basic compound so as to remove the acid anion. However, it has been found that one salt can be converted to a salt of another acid by simple displacement or by reacting one salt with a metal salt of another acid. The various salts differ in solubility in water, and the more insoluble salt can be precipitated in the displacement process. On the other hand, the acid of one salt can be substituted by another acid whose metal salt is more insoluble in the solvent used. To this end suitable solvents and suitable metal salts can be selected by any skilled chemist from solubility data in the literature for these metal salts.

The 3,5-bis(dimethylamino)-1,2,4-dithiazolium bromide representing a substituted 3,5-diamino-1,2,4-dithiazolium salt of this invention, wherein X is Br, may be prepared by the reaction (Procedure A):

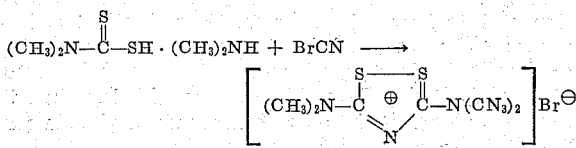

Similar salts are more advantageously prepared by the following series of reactions (Procedure B):

where Me represents alkali metal or ammonium ion,

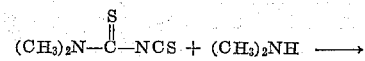

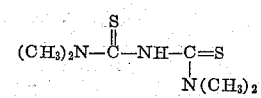

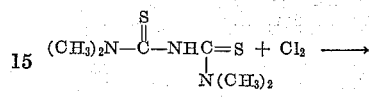

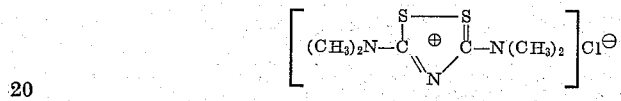

or more generally:

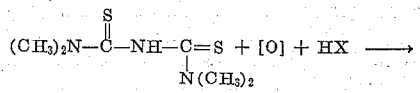

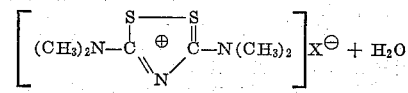

Procedure B has a definite advantage over Procedure A particularly in the chlorination procedure which produces the chloride directly.

Both procedures of preparing the compounds of this invention are illustrated by the following examples in which all parts and percentages are by weight.

Examples

*Procedure A.*—To a well-stirred mixture of 63.6 parts of cyanogen bromide in 800 parts methylene chloride at room temperature was added in small portions over a period of about one hour 99.6 parts of dimethylammonium dimethyldithiocarbamate. Cooling was applied to keep the temperature from rising above 30° C. When the reaction was complete, the precipitated solid was removed by filtration and the product was recovered by distilling off the methylene chloride in vacuo, extracting the product from the residue with hot water and subsequently evaporating the water. The solid product amounted to 19.63 parts which melted at 264–268° C. (dec.). This product is easily crystallized in purified form by dissolving in acetone, adding water gradually to turbidity, and allowing to crystallize. The purified crystalline salt M.P. 270–272° C. (dec.), analyzed C, 25.5%; H, 5.05%; N, 14.6%; S, 22.6%; Br, 28.1%; mol. wt. 260–270. The product forms a monohydrate from which water of hydration is driven off at 100° C. in vacuo.

From the 3,5-bis(dimethylamino)-1,2,4-dithiazolium bromide, the thiocyanic acid salt was prepared by dissolving the hydrobromic acid salt in about 5 times its weight of hot water and adding a chemically equivalent amount of 30% aqueous potassium thiocyanate. A voluminous salt crystallized out on cooling. This thiocyanate salt melted at 188–193° C. (dec.) and after crystallization from methanol melted at 196–198° C. (dec.), analyzed C, 34.0%; H, 4.85%; N, 21.9%; S, 37.7%; mol. wt. 249–258.

A picrate prepared in a similar manner melted at 165–174° C. (dec.).

*Procedure B* (peroxide oxidation).—A homogeneous mixture of 12.35 parts dimethylthiocarbamyl chloride and 10 parts potassium thiocyanate in 90 parts acetone was heated at about 55° C. for fifteen minutes, cooled, and filtered to remove precipitated potassium chloride. To the filtrate at about 25° C. was added 4.5 parts anhydrous dimethylamine over a 10-minute period. The reaction with the dimethyl amine was complete in this time. To the resulting mixture was added slowly with cooling 26.9 parts of 37% hydrobromic acid. Then 11.35 parts of 30% hydrogen peroxide was added dropwise with adequate cooling to keep the temperature below 30° C. A light tan solid product separated during the oxidation step and this was separated by filtration on completion of the reaction. A second crop of product was separated from the mother liquor. The combined crops were washed with acetone and dried. They amounted to 12.6 parts and a sample melted at 270–275° C. (dec.). This salt was shown by mixed melting point and by comparison of infrared spectra to be the same as the salt produced by Procedure A.

The melting points of representative salts prepared by this oxidation procedure using sulfuric acid in place of hydrobromic acid: 3-dimethylamino-5-diethylamino-1,2,4-dithiazolium bisulfate M.P. 211–217° C. (dec.); 3-dimethylamino - 5-di-n-butylamino-1,2,4-dithiazolium bisulfate M.P. 233–235° C. (dec.); 3-dimethylamino-5-morpholino-1,2,4-dithiazolium bisulfate M.P. 170–173° C. (dec.); and 3-dimethylamino-5-piperidino-1,2,4-dithiazolium bisulfate M.P. 217–220° C. (dec.).

*Procedure B* (chlorine oxidation).—A vessel provided with a cooling jacket, thermometer, condenser, and inlet tube was charged with 2300 parts acetone and 270 parts of potassium thiocyanate and stirred until homogeneous. Then 334 parts of dimethyl thiocarbamylchloride was added and the mixture stirred and heated at about 55° C. for 10 minutes. The mixture became yellow and potassium chloride separated. The mixture was cooled, filtered (suction), and the salt cake washed with acetone. The filtrate (including washings) was charged back into the same vessel. Then 121.5 parts of dimethylamine was passed in at a rate of 1 to 1.5 parts per minute, with stirring and cooling to keep the temperature below 30° C. After stirring for an additional 0.5 hour, the mixture was aspirated for 5 minutes to remove excess amine. Following removal of the amine, 173 parts chlorine were introduced into the solution at a rate of 1 to 2 parts per minute while stirring and cooling to keep the temperature below 30° C. The mixture became orange-colored and a solid began to separate almost immediately. Then the mixture became yellow as the reaction progressed and the solid became voluminous. After the chlorine addition was completed, the solid product was filtered (suction), washed with acetone twice and dried in the air overnight. The dried product amounted to 500 parts 3,5-bis(dimethylamino) - 1,2,4-dithiazolium chloride, representing a conversion of about 82% based on acid chloride and a yield of about 92% based on chlorine used, in the average run. The products were usually light tan or very light yellow in color. The product is further purified by making a concentrated aqueous solution (½ part water, 1 part product), warming slightly, filtering, and reprecipitating the product from the filtrate with acetone. The purified product is white and melts at 267–270° C. (dec.).

Procedure B is preferably carried out in an organic solvent medium rather than an aqueous medium, and at least the first two stages are preferably carried out in the absence of water for best yields. Solvents which are suitable for all steps of the process using oxidizing agents are the hydrocarbons, ketones, chlorinated hydrocarbons, alcohols, ethers, dioxane, and dimethylformamide. Solvents boiling below 150° C. are preferred. When a halogen is used as the oxidizer as in the chlorination step, hydrocarbons, ketones, and chlorinated hydrocarbons are preferred solvents.

In Procedure B the oxidizing agent is any of the well-known oxidizing agents for the oxidation of a sulfhydryl (—SH) to disulfide (—S—S—). Active oxygen such as that obtained from gaseous oxygen (e.g., air) or nascent oxygen formers are suitable sulfhydryl-to-disulfide oxidizing agents. Hydrogen peroxide, preferably 25–30% concentration, as well as elementary halogens are particularly suitable sulfhydryl-to-disulfide oxidizing agents. Other suitable oxidizing agents are organic peroxides and hydroperoxides, peroxy acids, and peroxyanhydrides. Peracids may be added in the form of their metal salts using sufficient acid for the purpose in addition to that for forming the salt of this invention. The oxidation may also be carried out by electrolysis.

In the oxidation step using a halogen as the oxidizing agent the halogen undergoes reduction producing the required anion to form a salt.

The oxidizing reaction temperature is normally about room temperature and since heat is given off in the reaction, cooling is neccessary to keep the temperature below about 70° C., and preferably below about 30° C. The oxidation will take place even at temperatures below 0° C. and the lower limit is not critical, but will vary somewhat with the oxidizing reagent used.

The nitrate was prepared by Procedure B by substituting a chemically equivalent amount of 68% $HNO_3$ for HBr in the oxidation step with hydrogen peroxide as the sulfhydryl-to-disulfide oxidizing agent. Similarly, the hydrochloride salt was prepared by substituting 38% hydrochloric acid for the HBr in the oxidation step with the hydrogen peroxide. The dihydrogen phosphate was prepared by substituting 85% phosphoric acid in chemically equivalent amount for the HBr in the oxidation step with the hydrogen peroxide. Similarly, the acid sulfate, the acetate, the trichloroacetate, the monochloracetate, and the picrate were prepared. Other salts of this invention are also readily prepared by displacement of HBr from the hydrobromide either directly with the corresponding acid or its monosodium salt or similar salt of another metal and the corresponding acid. The organic acid salts of this invention are particularly readily produced by this latter method.

The compounds of this invention have been shown by polarographic analysis, molecular weight determinations, and nuclear magnetic resonance analysis (NMR) to have a cyclic structure with a heterocyclic ring rather than the acyclic structure. The formula set forth above accordingly fits all of the facts now available. Compounds having this ring structure, in which the ring appears to have a positive charge whereby the anion is held, are believed to be novel. It is further believed that such compounds are produced only from tetra-substituted dithiobiurets in the oxidation process. The cyclic compounds produced by oxidation of dithiobiurets of lower substitution are distinctly different in being stable in the absence of anions whereas the present compounds are stable only in the presence of anions.

While the 3,5-dialkylamino-1,2,4-dithiazolium salts of this invention decompose when neutralized by addition of an alkali, all of the salts with strong acids of this invention are all quite stable.

The salts of this invention were all shown to have defoliating properties when made into a 0.15% aqueous emulsion or solution and sprayed on leaves of growing plants. Further testing on nearly mature cotton plants caused excellent defoliation with such a solution or emulsion at 1 to 3 pounds per acre. The defoliant action appears to be characteristic of all compounds having the dithiazolium salt structure and to be greater in those compounds having $R_1$ and $R_2$ groups with less than 8 carbon atoms than in those compounds having larger $R_1$ and $R_2$ groups.

The following are representative data on defoliation activity on cotton:

| $R_1$ | $R_2$ | X | Lb./acre | Defoliation percent after— | |
|---|---|---|---|---|---|
| | | | | 4 Days | 8 Days |
| $(CH_3)_2N—$ | $(N—Bu)_2N—$ | $HSO_4$ | 1 | 100 | 100 |
| $(CH_3)_2N—$ | $C_6H_5$ \ N— / $CH_3$ | $HSO_4$ | 1 | 75 | 83 |
| $(CH_3)_2N—$ | $C_6H_5$ \ N— / $CH_3$ | $HSO_4$ | 3 | —— | 100 |
| $(CH_3)_2N—$ | $(N—Pr)_2N—$ | $HSO_4$ | 1 | 58 | 92 |
| $(CH_3)_2N—$ | $(N—Pr)_2N—$ | $HSO_4$ | 3 | 92 | 100 |
| $(CH_3)_2N—$ | $(i—Pr)_2N—$ | $HSO_4$ | 1 | 67 | 67 |
| $(CH_3)_2N—$ | $(i—Pr)_2N—$ | $HSO_4$ | 3 | 100 | 100 |
| $(CH_3)_2N—$ | $(C_2H_5)_2N—$ | $HSO_4$ | 1 | 100 | 100 |
| $(CH_3)_2N—$ | $(N—C_{12}H_{25})_2N—$ | $HSO_4$ | 1 | 50 | 50 |
| $(CH_3)_2N—$ | $(N—C_{12}H_{25})_2N—$ | $HSO_4$ | 3 | 92 | 100 |
| $(CH_3)_2N—$ | $(CH_3)_2N—$ | $NO_3$ | 1 | 83 | 92 |
| $(CH_3)_2N—$ | $(CH_3)_2N—$ | $NO_3$ | 3 | 83 | 100 |

In the compounds of this invention the following are representative of $R_1$ and $R_2$: *alkylamino*—dimethylamino, diethylamino, dipropylamino, dibutylamino, dilaurylamino, didodecylamino, and dicyclohexylamino, methylstearylamino, distearylamino; *diarylamino*—diphenylamino, ditolylamino, tolylphenylamino, dinaphthylamino; *alkylarylamino*—methylphenylamino, butyltolylamino, cyclohexylphenylamino; *heterocyclic secamino*—piperidino and morpholino. $R_1$ and $R_2$ may be the same or different.

This application is a continuation-in-part of my copending application Serial No. 90,644, filed February 21, 1961, and now abandoned.

What I claim and desire to protect by Letters Patent is:

1. A compound of the formula

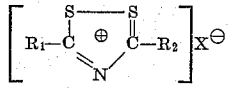

wherein X is an anion of an acid, HX, having an ionization constant of at least $1 \times 10^{-7}$ and $R_1$ and $R_2$ are substituted amino radicals selected from the group consisting of dialkylamino having from 2 to 36 carbon atoms, diarylamino having from 12 to 20 carbon atoms, alkylarylamino having from 7 to 12 carbon atoms, piperidino, and morpholino, and wherein aryl and alkylaryl are hydrocarbon.

2. A compound of claim 1 in which X is chlorine and $R_1$ and $R_2$ are dimethylamino.
3. A compound of claim 1 in which X is bisulfate and $R_1$ and $R_2$ are dimethylamino.
4. A compound of claim 1 in which X is bisulfate and $R_1$ is dimethylamino and $R_2$ is di-n-butylamino.
5. A compound of claim 1 in which X is chlorine, and $R_1$ and $R_2$ are di-n-butylamino.
6. The method of preparing a compound of the formula

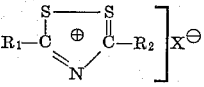

wherein X is an anion of an acid, HX, having an ionization constant of at least $1 \times 10^{-7}$ and $R_1$ and $R_2$ are substituted amino radicals selected from the group consisting of dialkylamino having from 2 to 36 carbon atoms, diarylamino having from 12 to 20 carbon atoms, alkylarylamino having from 7 to 12 carbon atoms, piperidino and morpholino, and wherein aryl and alkylaryl are hydrocarbon which comprises reacting at a reaction temperature below about 70° C. a dithiobiuret of the formula

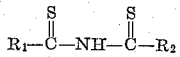

with an oxidizing agent capable of converting a sulfhydryl compound to a disulfide compound in the presence of said acid, HX.

7. The method of claim 6 in which the oxidizing agent is elementary chlorine and X is chlorine.

References Cited in the file of this patent
UNITED STATES PATENTS

| 2,285,409 | Bousquet et al. | June 9, 1942 |
| 2,410,862 | Bousquet et al. | Nov. 12, 1946 |
| 2,704,244 | Goodhue et al. | Mar. 15, 1955 |
| 2,756,135 | Searle | July 24, 1956 |
| 2,976,292 | Tung et al. | Mar. 21, 1961 |

OTHER REFERENCES

Morton: The Chemistry of Heterocyclic Compounds, (New York, 1946), page 113.

Swaminathan et al.: Chem. Abstracts, vol. 42, page 3350 (1948).